May 9, 1967  W. McGUIRE  3,318,036
SINKER RELEASE DEVICE FOR FISHING LINES
Filed Feb. 15, 1965  3 Sheets-Sheet 1
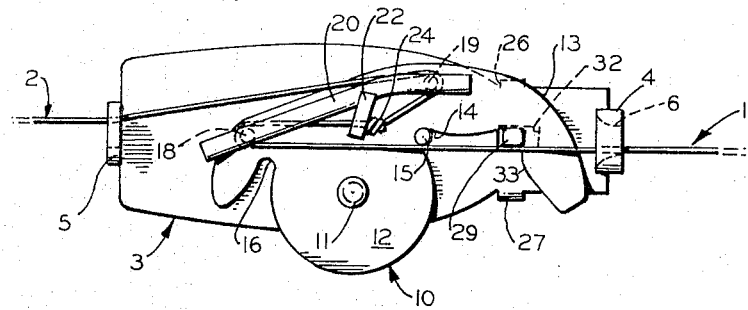
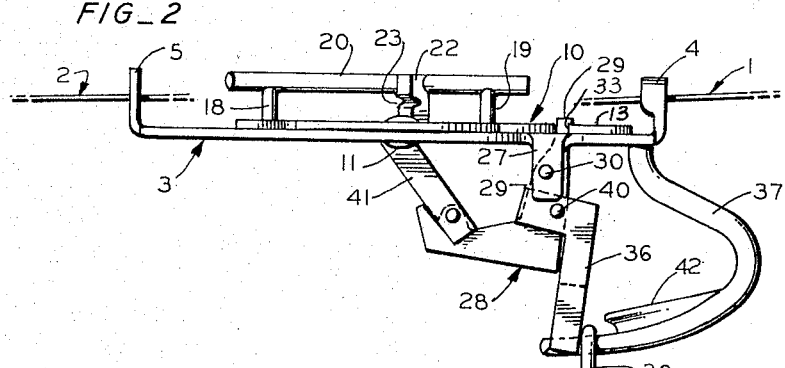
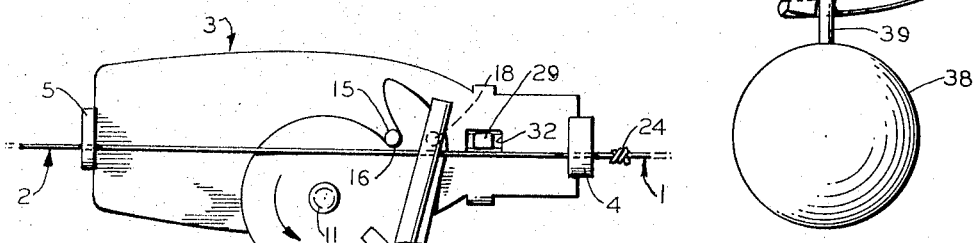
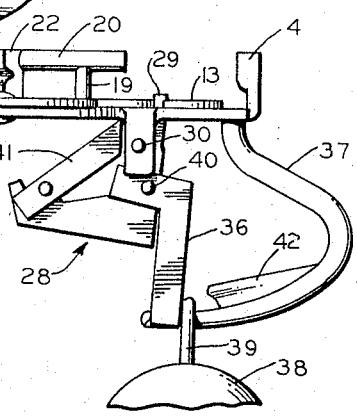
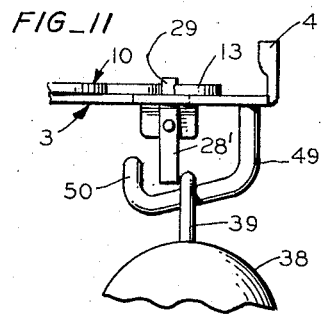
INVENTOR.
WAYNE McGUIRE
BY *Gordon Wood*
ATTORNEY

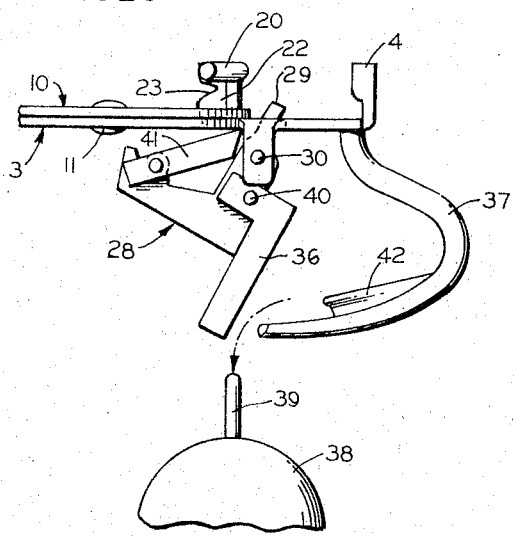
FIG_5
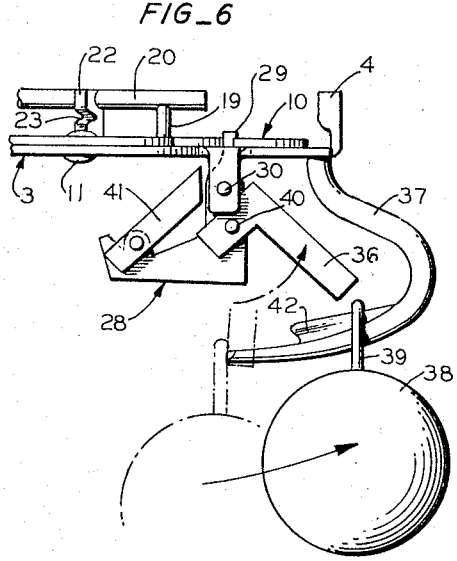
FIG_6
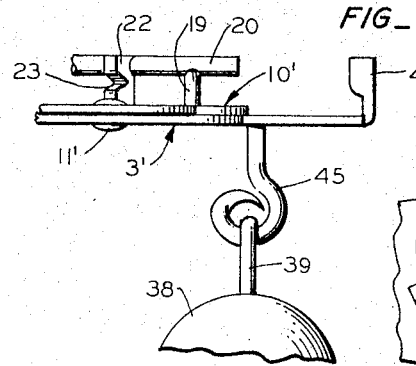
FIG_7
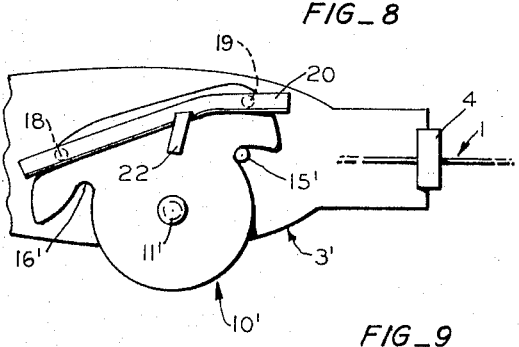
FIG_8
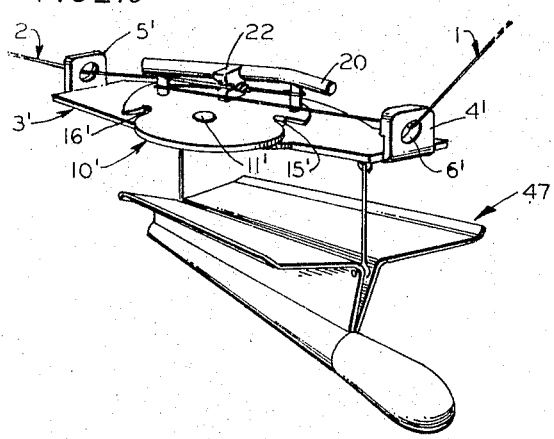
FIG_10
FIG_9
INVENTOR.
WAYNE McGUIRE
BY Gordon Wood
ATTORNEY May 9, 1967 W. McGUIRE 3,318,036
SINKER RELEASE DEVICE FOR FISHING LINES
Filed Feb. 15, 1965 3 Sheets-Sheet 3
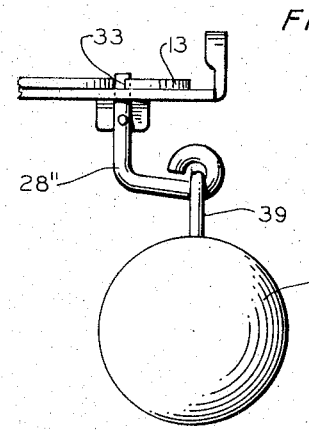
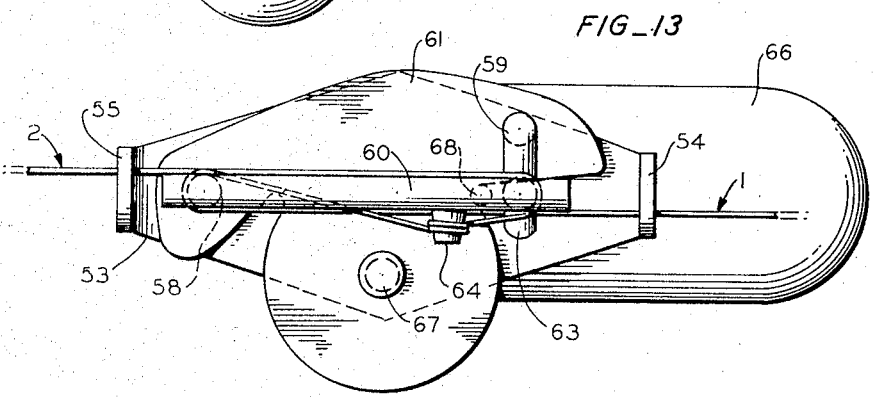
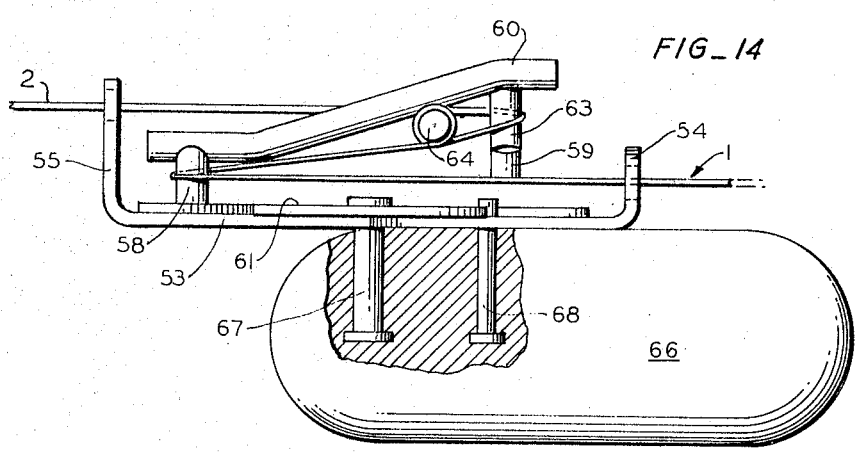
INVENTOR.
WAYNE McGUIRE
BY Gordon Wood.
ATTORNEY

United States Patent Office 3,318,036
Patented May 9, 1967

3,318,036
SINKER RELEASE DEVICE FOR FISHING LINES
Wayne McGuire, 321 North Gate Road,
Walnut Creek, Calif. 94598
Filed Feb. 15, 1965, Ser. No. 432,549
13 Claims. (Cl. 43—43.12)

This invention relates to a device adapted to connect a sinker to a fishing line at a point along the length of the latter so as to permit disconnection of the sinker from the line when a hooked fish pulls on the outer end of the line.

In trolling for a salmon it is necessary to provide a weight at a point spaced from the outer end or hook end of the line in order to ensure that said outer end attains the proper depth to catch the salmon. The sinker should not be attached to the line too close to the lure or bait since it would tend to scare off the fish. For this reason it has been customary to connect the sinker at a point anywhere from 10 to 40 feet from the hook.

When the fish has been hooked and the line reeled in the sinker cannot be drawn through the tip guide of the fishing pole since such guide is usually only about one quarter of an inch in diameter. For this reason the fish cannot be brought close enough to the boat to be landed conveniently. Furthermore, if the leader is then pulled in by hand, this creates a relatively large resistance in the line and the fish, by pulling against such resistance, frequently is able to free itself.

Aside from the problem of reeling in the line the use of a sinker creates another problem in salmon fishing because of the fact that salmon have soft mouths and can readily pull away from the hook if there is sufficient resistance for the fish to pull against. For this reason it has been customary in the past to provide a sinker release device which has the effect of automatically dropping the sinker weight whenever the fish pulls on the line with a predetermined amount of force. Examples of this type of device are shown in U.S. Patents Nos. 2,562,054, 1,033,464 and 2,830,400.

The main disadvantage of these patented devices is that the sinker release mechanism, although capable of dropping the sinker weight when the fish strikes, nevertheless cannot be pulled through the tip guide of the fishing pole so that the previously mentioned disadvantage still obtains. Even if the release device is designed to permit the leader to be pulled through the tip guide of the fishing pole, the prior art devices have the further disadvantage of causing the loss of the sinker weight each time the fish strikes. Inasmuch as the cost of the weights is considerable, such devices become extremely expensive to employ. (See, for example, Patent No. 2,825,993.)

The most desirable type of release device is obviously one which does not require the sinker weight to be dropped but provides means for securing the sinker weight at a point spaced from the hook and which device is disconnected from but remains slidable on the line when the fish strikes, so that the device may move toward the outer end of the line when the fish is reeled in. Such a device not only saves the expense of providing a new sinker each time a fish strikes but also permits the entire line to be reeled through the tip guide of the fishing pole. Furthermore, the device, being slidable on the line, does not normally offer sufficient resistance for the fish to pull against and free itself. Examples of prior art devices seeking to achieve this desirable result are shown in Patents Nos. 1,943,192 and 2,217,101.

These last mentioned patented structures, however, are not foolproof in operation, and are likely to be actuated to a released position during normal trolling even if a fish does not strike. Furthermore, the manner in which said prior art devices are actuated does not ensure their proper operation even when a relatively large tension is applied to the outer end of the line by the fish.

The main object of the present invention is to provide a sinker release device which has all the advantages of those prior art devices that are adapted to retain the sinker weight instead of dropping it when the fish is hooked.

Another object of the invention is the provision of a sinker release device which is adapted to automatically disconnect itself from the line when the fish strikes thus permitting the device to slide to the outer end of the line and thereby enable the fisherman to reel in the entire length of the line so that the fish may be hooked or netted with one hand while the fisherman holds the fishing pole in his other hand.

Still another object of the invention is the provision of a sinker release device which may be actuated in such a manner as to drop the sinker weight when fishing conditions are such that this is desirable. The invention is also capable of operation in such a way that the sinker weight does not become an expendable item but is retained on the line for reuse.

Yet another object of the invention is the provision of a sinker release device which does not require the fixed securement of any other apparatus to the line at the inner end of the leader.

Another object of the invention is the provision of a sinker release device which is adapted to be employed with a trolling planer so that the planer may be disconnected from, but retained on, the fishing line after the fish strikes.

Other objects and advantages will be apparent from the following specification and from the drawings.

FIG. 1 is a top plan view of the preferred form of the invention shown in locked position relative to a fishing line.

FIG. 2 is a side elevation of the structure of FIG. 1.

FIG. 3 is a plan view showing the device of FIG. 1 in released position.

FIG. 4 is a side elevation similar to FIG. 2 but showing the detent in a position permitting the sinker weight to be dropped.

FIG. 5 is a view similar to FIG. 4 showing the sinker weight released.

FIG. 6 is a view similar to FIG. 4 showing the sinker weight being applied to the device.

FIG. 7 is a fragmentary side elevation of a modified form of the invention.

FIG. 8 is a top plan view of the structure of FIG. 7.

FIG. 9 is an end view of the device of FIG. 7.

FIG. 10 is a perspective of a form of the invention similar to that shown in FIG. 7 but used with a trolling planer.

FIG. 11 is a fragmentary side elevation of another modified form of the invention.

FIG. 12 is a view similar to FIG. 11 showing still another modified form of the invention.

FIG. 13 is a top plan view of another modified form of the invention.

FIG. 14 is a front elevation partly in section of the device of FIG. 13.

The preferred form of the invention is illustrated in FIGS. 1 through 6 wherein the inner end of the fishing line which leads to the fishing pole tip guide (not shown) is indicated at 1 and the outer end of the fishing line constituting the leader and connected at its opposite end to the hook (not shown) is indicated at 2.

The invention comprises a relatively flat elongated body 3 which is provided at its opposite ends with upturned apertured ears 4, 5 for receiving the fishing line therethrough. At least ear 4 of the forward end of the device is preferably provided with a smooth flared aperture 6 since in this form of the invention a knot formed on the line is required to be drawn through said aperture 6.

Mounted on the body 3 is a locking member generally designated 10 which is swingably connected by means of a pin 11 to the body 3. The locking member 10 includes a substantially circular central portion 12 from which extends in a forwardly direction a finger 13. At the juncture between the central circular portion 12 and the finger 13 the locking member 10 is provided with a recess 14 which is adapted to receive therein a stop in the form of a pin 15 fixedly secured to the body 3. At this point it will be noted from FIG. 1 that the pin 15 prevents rotation of the locking member 10 in a clockwise direction from the locked position illustrated.

On the opposite side of the central circular portion 12 of the locking member 10 there is formed a recess 16 similar to recess 14 and in which recess 16 the pin 15 is adapted to be received when the locking member 10 is rotated from the position of FIG. 1 to the position of FIG. 3 corresponding to the released position of the device.

Extending upwardly from the locking member 10 adjacent the recess 16 is a post 18 around which the inner end of the line 1 is passed (FIG. 1). At a point adjacent the recess 14 the locking member 10 is provided with another upstanding post 19 around which the outer end 2 of the line is passed. Extending between the upper ends of posts 18, 19 and fixedly secured thereto is an elongated bar 20 which overhangs said posts at its opposite ends thereby preventing the line from slipping upwardly away from the body 3.

Fixedly secured as by soldering to the locking member 10 and to the bar 20 is a plate 22 which is formed to provide a notch 23 (FIG. 2). The line is adapted to be received in said notch 23 and, in the preferred form of the invention, a knot indicated at 24 is formed in the line so that said knot 24 may abut plate 22 with the inner end of the line being received within the slot or notch 23. The knot 24 may be conveniently considered to be the dividing point between the inner end 1 and the outer end 2 of the line.

With the line passed through the apertured ears 4, 5 and passing around posts 18 and 19 and with the knot 24 received against plate 22 it will be apparent that tension in the inner end 1 of the line causes the locking member 10 to be urged in a clockwise direction against the fixed pin 15. It may also be noted that at this point under normal conditions the tension in the outer end 2 of the line is normally relatively light and insufficient to cause the locking member 10 to swing in a counter-clockwise direction against the moment created by the tension in the inner end 1 of the line.

Fixedly secured to the opposite sides of body 3 are a pair of depending ears 26, 27 on which is swingably secured a catch element indicated at 28. This catch element is formed to provide a generally vertically extending leg 29 by which the catch 28 is swingably mounted on ears 26, 27 through a pin 30. The leg 29 of catch 28 extends upwardly through a slot 32 formed in the body 3 and is adapted to engage the locking plate 10 when the latter is in its locked position of FIG. 1. The forwardly extending finger 13 of locking plate 10 is formed to provide a camming surface 33 against which the upper leg 29 of the catch 28 presses in the locked position of FIG. 1. The shape of the camming surface 33 is such that it is necessary for the leg 29 to move slightly to the left in order for the locking plate 10 to swing counterclockwise from the position of FIG. 1.

Swingably mounted on the catch element 28 is a bifurcated lever 36 which is in aboutment with catch element 28 in the position of FIG. 2 but which is adapted to swing counterclockwise relative to said catch element to an upper position indicated in FIG. 6. The lower end of lever 36 is in straddling relationship to the free lower end of a hook member 37 which in turn is fixedly secured at its upper end to the body 3 adjacent the forward ear 4 of the latter. Mounted on the hook 37 adjacent the free end of the latter is a sinker weight 38 which is provided with a staple 39 for receiving the hook 37 therethrough. The lever 36 is swingably supported on catch element 28 by means of pin 40 and it will be noted in FIG. 2 that the sinker weight 38 is urged against the lower end of lever 36 by gravity and, since the lever is in abutment with the catch 28 the latter is urged at the upper end of leg 29 into engagement with the camming surface 33 of locking member 10. In order for the locking member 10 to swing in a counterclockwise direction from the position of FIG. 1 it will be seen that it is necessary for the lower end of lever 36 to urge the weight 38 slightly to the right in FIG. 2. It should also be noted at this point that movement of the device through the water results in additional loading being applied on the camming surface 33 of locking member 10 because of the force of the water against the weight 38 as the device proceeds to the right (FIGS. 1 and 2).

Pivotally secured to the catch element 28 and extending diagonally upwardly therefrom is a detent 41 which may be in the form of a bifurcated bar bevelled at its upper end to abut the underside of body 3. Said detent 41 functions to prevent the sinker 38 from falling off the end of hook 37 since it restricts clockwise movement of the catch 28 and lever 36 from the position of FIG. 2.

The operation of the device of FIGS. 1 through 6 can now be described. When the tension in the outer end 2 of the fishing line is raised beyond a predetermined amount by the pull of the fish thereon the locking member 10 is swung in a counterclockwise direction from the position of FIG. 1 to the position of FIG. 3 with the knot 24 being released at a point intermediate the locked position of FIG. 1 and the released position of FIG. 3. It will be noted in connection with the releasing operation that the perpendicular distance from the outer end 2 of the line to pivot 11 is substantially greater than the perpendicular distance from the inner end 1 of the line so that the moment created by the tension in the outer end 2 of the line is aided by a mechanical advantage over the tension in the inner end 1. However, in this same connection it will be understood that the weight of the sinker 38 acting through the lever 36 and the catch 28 impresses a frictional resistance on the camming edge 33 of the locking member thus increasing the tension necessary in the outer end 2 of the line to swing the locking member from its locked position of FIG. 1.

As the locking member 10 starts to move from its locked position of FIG. 1 it should be noted that several factors contribute to accelerating movement to the final released position. First, release of catch 28 from the camming surface 33 on finger 13 reduces the resistance to counterclockwise movement. Second, the perpendicular distance from the inner end 1 of the line to the pivot 11 becomes reduced thus reducing the opposing moment. Third, after the inner end 1 of the line crosses pivot 11 the tension in said inner end assists, instead of opposing, movement to the released position. From a consideration of FIGS. 1 and 3 it will also be apparent that the tendency of the line to straighten effectively releases the knot 24 from plate 22.

With the device in the position of FIG. 3 it will be apparent that the same may slide along the line with the knot 24 moving through the smooth flared aperture 6 of the ear 4 so that gravity permits the device to move down to the outer or hook end of the line. The knot 24 may, of course, be readily pulled through the small tip guide of the fishing pole.

It is desirable to retain the staple 39 of the sinker 38 in a position adjacent the lower end of lever 36 so that a component of the weight of the sinker is always impressed on the lower end of said lever. To this end a projection 42 is fixedly secured as by soldering to the hook 37 as shown in FIG. 2.

In the above described form of the invention it will be noted that the sinker 38 does not drop from the device when the fish strikes but rather is retained on hook 37 because of the action of detent 41. If it is desired to permit the sinker 38 to drop from the device as in some prior art release mechanisms, the detent 41 is swung clockwise to the position of FIG. 4 when the device is being set up for use. This repositioning of detent 41 may be accomplished by first swinging the catch element 28 in a counterclockwise direction together with the lever 36 to provide enough clearance for the detent to be swung to the indicated position of FIG. 4. In view of the fact that the slot 32 in body 3 is elongated in a longitudinal direction the upper leg 29 of catch element 28 is permitted to move to the right when the locking member 10 is rotated to its released position thus permitting the lever 36 to swing in a clockwise direction (FIG. 5) and allowing the sinker 38 to drop from the hook 37.

When it is desired to insert a new sinker on the hook 37 the lever 36 may be swung in a counterclockwise direction as indicated in FIG. 6 to permit the eye or staple 39 of the sinker to be moved upwardly past the lever 36 onto the projection 42. Thereafter, when lever 36 is swung downwardly the staple 39 of sinker 38 may be brought down to the working position of FIG. 2 or FIG. 4.

In the modified form of the device shown in FIGS. 7, 8 and 9, the weight of the sinker is not employed to exert frictional resistance on the locking member and for this reason the sinker 38 may simply be attached to the body 3' by means of a hook 45. This hook is preferably provided with an offset end as seen in FIG. 9 to prevent accidental disengagement of the sinker staple 39 therefrom. It can be seen in FIG. 8 that the locking member 10' is substantially the same as locking member 10 of FIGS. 1 through 6 except that the forwardly extending finger 13 is not required.

In both of the above described forms it will be apparent that a relatively high tension is impressed in the inner end of the fishing line because of the fact that it is supporting the device and also the sinker weight 38. In the form shown in FIGS. 7 through 9 the amount of tension required to swing the locking member 10' to the released position may be varied by changing the proportions of the locking member 10 so that the perpendicular distances from the inner and outer ends of the line to the pivot 11' are varied as desired. The device of FIGS. 7 through 9 may also be employed as shown in FIG. 10 in combination with a conventional trolling planer generally designated 47. No claim is made herein to such conventional trolling planer except in combination with the invention described.

Another modification of the invention which operates to release the sinker weight from the line and at the same time retain the weight attached to the device is shown in FIG. 11. In this structure the device is identical to that shown in FIGS. 1 through 6 except that a simplified catch is employed. This simplified catch merely comprises a lever 28' which, at its lower end, is engaged by the staple 39 of sinker 38. The staple 39 is suspended on a downwardly slanting hook 49 provided with an upwardly extending portion 50 at its free end to retain the sinker weight 38. The shape of hook 49 is such that a component of the weight of sinker 38 is impressed on the lower end of lever 28' so that the upper end of said lever is urged against the camming surface 33 of the locking plate 10.

A modification of the structure of FIG. 11 is shown in FIG. 12 wherein a catch 28" in the form of a lever is provided with a forwardly extending portion at its lower end formed to the shape of a hook for receiving thereon the staple 39 of a sinker weight 38. By this structure it will be seen that the weight of sinker 38 is again impressed on the camming surface 33 of locking member 10.

The modified form of the invention shown in FIGS. 13, 14 permits the elimination of a substantial part of the structure shown in FIGS. 1 through 6. In this case the main body portion of the device comprises a generally elongated plate 53 provided with a relatively short upstanding flange 54 at its forward end which is apertured to receive therethrough the inner end 1 of the fishing line. At the rear end of the plate 53 is a relatively long flange 55 which is apertured at a point substantially higher than the aperture in flange 54 so that the outer end 2 of the fishing line is offset from but generally parallel to the inner end 1. Posts 58, 59, similar to posts 18, 19 (FIG. 1), are provided on a locking member 61 and said posts are connected at their upper ends by elongated bar 60 similar to bar 20 hereinbefore described. The post 59 is bent horizontally at its upper end and connects with a joggled portion 63 depending from bar 60 and around which the outer end 2 of the line is adapted to be passed.

Extending outwardly from bar 60 adjacent post 59 is a pin 64 adapted to receive one or more turns of the line therearound. Said turns create sufficient friction to releasably secure the line thereto so as to obviate the use of the knot shown in the form of the device of FIGS. 1 through 6. The inner end 1 of the fishing line is passed around post 58 in a similar manner as it is passed around post 18 in the embodiment shown in FIG. 1.

From FIG. 13 it will be apparent that the perpendicular distance between outer end 2 and inner end 1 of the fishing line is shown substantially the same although it is preferable that the outer end 2 act through a larger moment arm than inner end 1. However, the present invention contemplates the variation of the moment arms on which the tensions in the inner and outer ends of the line act and it will be seen from the structure of FIGS. 13 and 14 that this is readily accomplished by modification of the structure that is secured to locking member 61 so that the perpendicular distances from the two parts of the line are such as to accomplish the result desired.

The advantage of the structure of FIGS. 13 and 14 is that by vertically offsetting the inner and outer ends of the line any possibility of interference between the two is effectively obviated.

It will be apparent that the slot or notch structure of the preferred form may be incorporated in the embodiment shown in FIGS. 13 and 14 so as to cooperate with a knot formed in the line. The knot has the advantage of providing a more positive interengaging element on the line but the looped structure of FIGS. 13 and 14 nevertheless works effectively in most instances.

The embodiment of the invention shown in FIGS. 13 and 14 lends itself to use with a fixed sinker weight 66 which may be cast of lead and secured to the plate 53 by providing elongated pins 67, 68 to act, respectively, as the pivot of locking member 61 and its stop.

It will be apparent that the above described invention provides an effective method of achieving all of the advantages of using a sinker and at the same time permitting the sinker weight to be retained rather than dropped from the device. Furthermore, if the fisherman prefers to permit the sinker weight to be dropped this procedure is readily provided for by the structure shown in FIGS. 1 through 6.

In most instances the release of the device from the fishing line, though said device is still slidably supported on said line, eliminates the resistance which the fish would otherwise have to pull against after it is hooked. The fisherman is permitted to "play" the fish in the same manner as would be possible if the sinker weight were dropped in the manner provided for in some prior art structures.

The very specific description given above of the various embodiments of the invention should not be taken as restrictive of the invention since it is apparent that various modifications in design may be resorted to without departing from the scope of the following claims.

I claim:
1. A sinker release device for use with a fishing line comprising:
   a body provided with means for slidably supporting the same relative to a fishing line between the inner and outer ends of the latter,
   a locking member swingably supported on said body at a pivot offset to one side of said inner end for movement from a locked position to a released position, and vice versa,
   interengaging elements on said line and said member when the latter is in said locked position for locking said body relative to said line,
   said member being adapted to be swung from said locked position about said pivot to said released position upon the application of a predetermined pull on said outer end for releasing said interengaging elements and permitting said device to slide freely on said line, said line being offset in its entirety to one side of said pivot in both the locked and released positions of said member.

2. A device according to claim 1 wherein a pivoted catch element is provided on said body and in engagement at a point thereon with said member when the latter is in said locked position, said catch being in engagement at another point thereon with a sinker whereby the weight of said sinker urges said catch into engagement with said member.

3. A device according to claim 1 wherein said body supports a catch in frictional engagement with said member for providing a predetermined resistance to movement of said member from said locked position.

4. A device according to claim 1 wherein, a stop is provided on said body preventing rotation of said member in one direction beyond a predetermined point, the tension in the inner end of said line acting to urge said member in said one direction against said stop.

5. A device according to claim 4 wherein, the outer end of said line engages said member at a point such that the perpendicular distance from said outer end of said line to said pivot is greater than the corresponding distance from said inner end.

6. A device according to claim 5 wherein said member is formed to offset the lines of action of said inner and outer ends of said line to prevent interference between the latter.

7. A sinker release device for use with a fishing line comprising:
   a body provided with a pair of spaced apart guide elements for receiving a fishing line therethrough for slidably supporting said body on said line in a released position between the inner and outer ends of the latter,
   a locking member swingably supported on said body intermediate said elements for movement from a locked position to a released position and vice versa,
   said line being provided with a fixed enlargement and said member being formed with a slot for receiving said line therein with said enlargement in abutment with said member when said member is in said locked position,
   a stop on said body engaged by said member for preventing swinging of said member in one direction past a predetermined point corresponding to said locked position,
   said member being formed with means to transmit the tension in the inner end of said line to said member for urging said member in said one direction into engagement with said stop when said member is in said locked position,
   said member being formed with means to transmit the tension in the outer end of said line to said member for urging said member in the opposite direction away from said stop,
   whereby when the tension in said outer end exceeds a predetermined amount, said member is rotated in said opposite direction to said released position against the tension in said inner end and said line is thereby freed from said member to permit said body to slide on said line by said guide elements.

8. A device according to claim 7 wherein a catch is swingably supported on said body and adapted to frictionally engage said member when the latter is in said locked position, means for urging said catch into engagement with said member with a predetermined force to oppose movement of said member in said opposite direction.

9. A device according to claim 8 wherein the means for urging said catch into engagement with said member comprises a sinker.

10. A device according to claim 9 wherein said catch releases said sinker from said body when said member swings from said locked position to said released position.

11. A sinker released device including a body provided with means thereon for slidably supporting the same on a fishing line, a sinker weight releasably secured to said body, retaining means pivoted on said body for normally preventing release of said weight from said body, means operatively connecting said retaining means with the outer end of said line whereby said retaining means is actuated to permit release of said weight when the tension in said outer end exceeds a predetermined amount.

12. A device according to claim 11 wherein means is provided to prevent actuation of said retaining means if desired whereby said weight is retained despite the increase in tension in said outer end beyond a predetermined amount.

13. A device according to claim 1 wherein means is provided for connecting a sinker to said body when said member is in said locked position, said means being movable to a disconnecting position for releasing said sinker when said member is moved to said released position.

References Cited by the Examiner

UNITED STATES PATENTS

| 1,943,192 | 1/1934 | Semar | 43—44.88 |
| 2,564,426 | 8/1951 | Curtiss | 43—44.88 |
| 2,844,906 | 7/1958 | Phillips | 43—43.12 |
| 3,269,051 | 8/1966 | Saunders | 43—43.12 |

FOREIGN PATENTS 706,365    3/1954   Great Britain.

SAMUEL KOREN, *Primary Examiner.*

D. J. LEACH, *Assistant Examiner.*